Sept. 1, 1964          D. E. KOTAS          3,147,406
VOLTAGE TO FREQUENCY TRANSDUCER
Filed June 13, 1957
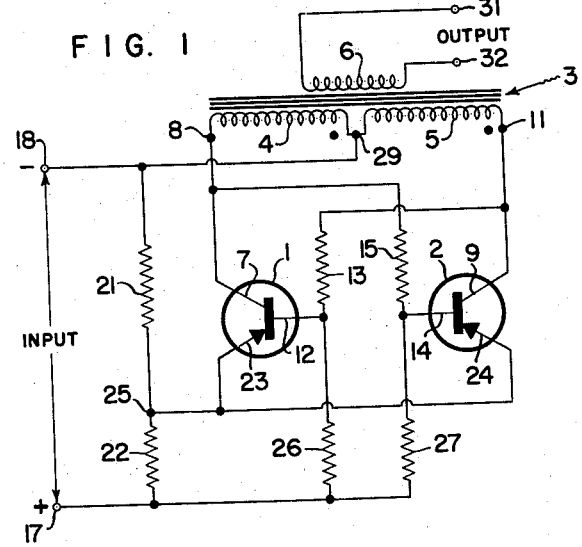
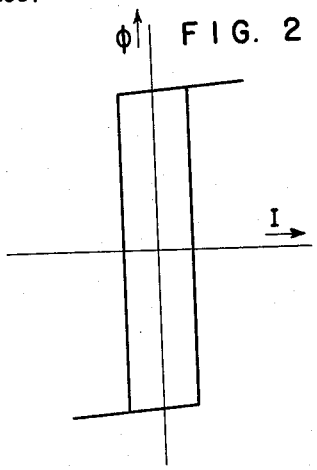
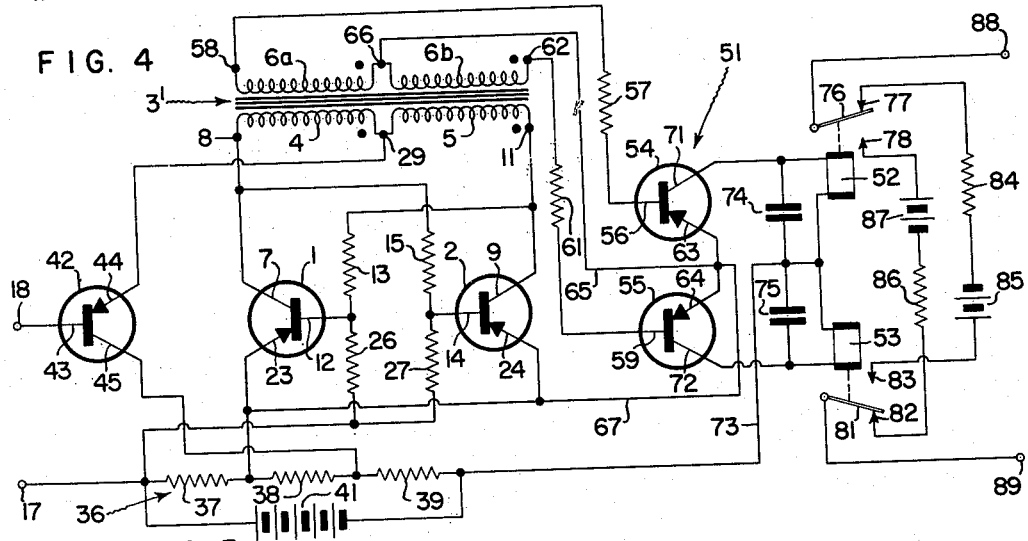
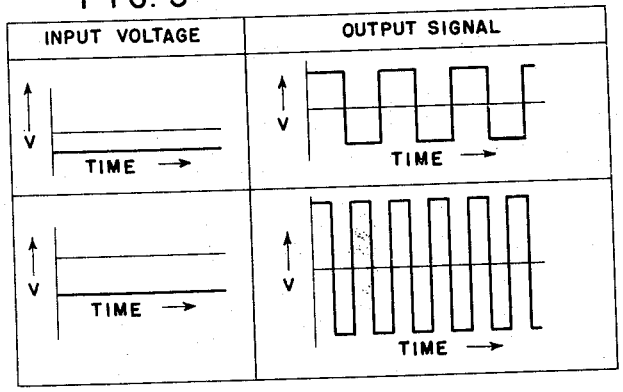
*INVENTOR.*
DONALD E. KOTAS
ATTORNEY.

United States Patent Office 3,147,406
Patented Sept. 1, 1964

3,147,406
VOLTAGE TO FREQUENCY TRANSDUCER
Donald E. Kotas, Philadelphia, Pa., assignor to Minneapolis-Honeywell Regulator Company, Minneapolis, Minn., a corporation of Delaware
Filed June 13, 1957, Ser. No. 665,421
12 Claims. (Cl. 317—146)

The present invention generally pertains to that class of electrical apparatus known as oscillators. More specifically, the present invention is concerned with the type of oscillator which is adapted to oscillate at a frequency determined by the magnitude of a direct current signal.

A general object of the present invention is to provide a new and improved oscillator.

A specific object of the present invention is to provide a new and improved oscillator which is characterized by its reliability and simplicity of structure and is adapted to oscillate at a frequency proportional to the magnitude of a direct current signal.

Another specific object of the present invention is to provide a new and improved oscillator which will oscillate at frequencies suitable for use with known types of standard telemetering and teletype communication facilities.

In telemetering systems, it is often desirable to convert a direct current signal, having a magnitude representative of a condition being measured or controlled, into a signal having a frequency proportional to the magnitude of the direct current signal. Such a signal can then be transmitted by suitable means of communication to a remote location where it can be translated into a readily comprehensible reading of the condition being measured or controlled. Information about a condition is generally in the form of a direct current voltage produced by a transducer sensitive to pressure, temperature, flow, humidity, and so on. A large variety of transducers are commercially available which will produce a direct current voltage proportional to the magnitude of such conditions. Accordingly, it is still another specific object of the present invention to provide an oscillator suitable for use in a telemetering system which is adapted to receive a voltage input of a magnitude which can be readily obtained by either amplifying the output of such transducers or converting that output to current by means of a millivolt to current transducer and then passing the current so developed through a resistor to produce a voltage signal.

A further object of the present invention is to utilize transistors and a saturable core transformer in an oscillator circuit to provide an oscillator capable of oscillation at a frequency proportional to a D.C. voltage.

A still further object of the present invention is to provide a saturable core oscillator, employing transistors as switching elements, wherein the transistor control signals are obtained directly from the primary core windings.

According to the present invention, a pair of junction transistors, operated as synchronous switches, is employed to alternately switch a D.C. voltage across similar windings on a saturable magnetic core. The switching action of the transistors thus causes the flux in the saturable core to be cycled between positive and negative saturation. The output voltage of the saturable transformer is a square wave, the frequency of which is directly proportional to the magnitude of the D.C. input voltage.

A better understanding of the present invention may be had from the following description read with reference to the accompanying drawings, of which:

FIG. 1 is a circuit diagram of a basic embodiment of the present invention;

FIG. 2 shows a typical flux-current curve for the square hysteresis loop material of which the core of the saturable transformer shown in FIG. 1 is made;

FIG. 3 is a table showing the wave form of the output signal from the circuit of FIG. 1 for various input signals; and FIG. 4 is a circuit diagram of a preferred embodiment of the present invention utilized in a telemetering transmitter.

Referring now to FIG. 1, there is shown a circuit diagram of the basic circuit of the present invention. This circuit employs a pair of switching devices 1 and 2 and a saturable core transformer 3 to convert a D.C. voltage signal into an alternating current having a frequency proportional to the magnitude of the D.C. voltage. Each of the switching devices 1 and 2 is in the form of a three electrode semiconductor device commonly referred to as a transistor. The transistors illustrated are pnp junction transistors having the usual emitter, collector, and base electrodes. It should be noted, however, that the transistors 1 and 2 could be either npn junction transistors or point-contact transistors. The saturable core transformer 3 has a center tap primary winding having equal winding sections 4 and 5 and a secondary winding 6. The collector 7 of the transistor 1 is connected to an end terminal 8 of the primary winding section 4 of the transformer 3. Similarly, the collector 9 of the transistor 2 is connected to an end terminal 11 of the primary winding section 5 of the transformer 3. The base 12 of the transistor 1 is connected by means of a resistor 13 to the collector 9 of the transistor 2 and the base 14 of the transistor 2 is connected by means of a resistor 15 to the collector 7 of the transistor 1.

The numerals 17 and 18 designate respectively the positive and negative input terminals to the circuit of FIG. 1. As shown, a pair of resistors 21 and 22 are connected in series across the input terminals 17 and 18. These resistors are included to provide a positive bias for the transistors 1 and 2. To this end, the emitter 23 of the transistor 1 and the emitter 24 of the transistor 2 are connected to the junction 25 of the resistors 21 and 22. The positive input terminal 17 is connected to the base 12 of the transistor 1 and to the base 14 of the transistor 2 by means of a pair of resistors 26 and 27 respectively. The input terminal 18 is connected directly to the center tap 29 of the primary winding of the saturable transformer 3. The output of the circuit appears across the secondary winding 6 of the saturable transformer 3 which is connected to the circuit output terminals 31 and 32.

In considering the operation of the circuit of FIG. 1, it should be noted that the transistors 1 and 2 are operated as synchronous switches. When the base of either transistor is positive with respect to its emitter, the transistor will act as an open switch with a very low leakage. When the base of either transistor is negative with respect to its emitter, the transistor will act as a closed switch with a very low voltage drop. Thus, in the absence of any control signal on the respective base electrodes of the transistors 1 and 2, the positive bias applied thereto by the resistors 22, 26, and 27 biases these transistors in an open switch condition. This bias assures good switching operation but is not essential to the circuit operation.

It should be noted, that the input voltage to the circuit of FIG. 1 is applied across the primary winding sections 4 and 5 of the transformer 3 through two separate electrical paths which effect opposing directions of magnetization in the core 3. The transistor 1 controls the energization of one of these paths while the transistor 2 controls the energization of the other of these paths.

The saturable transformer 3 is wound on a core of square hysteresis loop material. A typical $\phi$–$i$ curve for such a core material is illustrated in FIG. 2. As will be shown, the transistors 1 and 2 are alternately conductive and non-conductive, thus switching the voltage across the resistor 21, which is proportional to the input voltage, across the primary winding sections 4 and 5 of the transformer 3, causing flux in the core to be cycled between positive and negative saturation. The switching action of the transistor 1 is controlled by the potential of the collector 9 of the transistor 2 and similarly the switching action of the transistor 2 is controlled by the potential of the collector 7 of the transistor 1. Assuming that current is flowing through the primary winding sections 4 from the terminal 8 to the center tap 29, the transistor 1 is conducting and its base 12 is biased for high conduction because of the transformer action of the primary winding of the transformer 3 which makes the end terminal 11 of the primary winding section 5 negative with respect to the end terminal 8. Conversely, the base 14 of the transistor 2 is biased in a non-conductive state. The current continues to flow in this manner until the core of the saturable transformer 3 saturates, at which time the voltage across the primary winding drops to zero. This causes the collector voltages of the transistors 1 and 2 to rise to the potential of the center tap 29. Since the end terminals 8 and 11 of the transformer primary winding are now at the same potential, the net current effect is reduced to zero as the transistors 1 and 2 are biased for approximately equal conduction. The flux in the core of the transformer 3, however, follows the path of the hysteresis loop shown in FIG. 2 and it can be seen that this flux decreases slightly as the net current effect is reduced to zero. This decrease in flux creates enough of a voltage reversal to cause the transistor 1 to be cut off and the transistor 2 to conduct. Actually, although the flux decrease is small, the rapidity with which the current effect is reduced to zero causes the voltage reversal to be about thirty percent of the original voltage.

The output voltage from the circuit is a square wave having a half cycle duration depending upon the time necessary for the flux in the core of the transformer 3 to change from $-\phi_m$ to $+\phi_m$.

Neglecting the resistance of the primary winding sections 4 and 5 and the voltage drop across the transistors 1 and 2, the frequency of these square waves is dependent upon the parameters of the core of the transformer 3 in the input voltage. From elementary magnetics, the voltage across a coil is proportional to the number of turns times the rate of change in flux.

(1) $$e = N\frac{d\phi}{dt} \times 10^{-8}$$

where:

$e$ = voltage in volts
$N$ = number of turns
$\phi$ = flux in gauss
$t$ = time in seconds In one period of conduction in one direction through the coil, the flux in the core will transverse from saturation flux density of one direction and saturation flux density in the other direction. If either is assumed constant, Equation 1 can be integrated with respect to time.

(2) $$e\int dt = 10^{-8} N \int \frac{d\phi}{dt} dt$$

or putting in the limits:

(3) $$e\int_0^{\frac{1}{2f}} dt = 10^{-8} N \int_{-\phi\,\text{sat.}}^{+\phi\,\text{sat.}} d\phi$$

where $f$ = repetition rate of the output pulses
$\phi$ sat. = saturation flux density of core material integrating (4) $$\frac{e}{2f} = 10^{-8} N 2\phi\,\text{sat.}$$

(5) $$f = \frac{e}{4 \times 10^{-8} N \phi\,\text{sat.}}$$

The limit $\frac{1}{2}f$ is the time during which the current will flow in one direction through the coil, that is, half the period of the output frequency. Therefore, from Equation 5 it can be seen that the output frequency is proportional to $e$. Equation 5 holds for any fixed value of $e$. It will also hold for any variable but unidirectional $e$ where $f$ represents the frequency for the average value of $e$ during any half cycle. FIG. 3 is a table showing the relationship between the magnitude input voltage to the circuit of FIG. 1 and the frequency of the output signal from that circuit.

The oscillator of FIG. 1 was designed for use in a telemetering transmitter wherein a D.C. signal having the magnitude proportional to a condition being measured or controlled, is converted into an A.C. signal having a frequency proportional to the magnitude of the D.C. signal. This A.C. signal can then be transmitted by suitable means of communication to some distant point where it can be translated into a readily comprehensible reading of the condition being measured or controlled. Telephone channels are the most frequently used means of transmission for telemetered signals. Due to the parameters of telephone channels, it is desirable that the frequency of the telemetered signal be kept low. In addition, the rate charged by telephone companies for these facilities is generally predicated in part on the transmission frequency employed, with the lowest rate being charged where the transmission frequency is below 15 cycles per second. Since the frequency of oscillation of the oscillator of FIG. 1 is dependent upon the number of turns on the transformer core and the parameters of that core as well as the input voltage, the core can readily be designed to cause the oscillator to oscillate over a frequency of ranges as low as from 5 to 15 cycles per second for an input voltage variation of the range of from 4 to 12 volts. It should be noted, that a 4 to 12 volt input voltage range can be readily obtained by either amplifying the millivolt output usually available from transducers or by converting the millivolt output of the transducer to current in a millivolt to current transducer and then developing a voltage from this current by means of a precision resistor.

Referring now to FIG. 4, there is shown a circuit diagram of a preferred embodiment of the present invention utilized in a telemetering transmitter. Similar reference characters have been employed to designate structure identical to that employed in the circuit of FIG. 1. The saturable transformer 3 of FIG. 1 has been replaced with the saturable transformer 3' which is identical to the saturable transformer 3 except that the secondary winding 6 has been replaced with a center tap secondary winding having equal winding sections 6A and 6B. As in FIG. 1, the collector 7 of the transistor 1 is connected to the end terminal 8 of the primary winding section 4 and the collector 9 of the transistor 2 is connected to the end terminal 11 of the primary winding section 5. The base 12 of the transistor 1 is connected by means of the resistor 13 to the collector 9 of the transistor 2 and similarly, the base 14 of the transistor 2 is connected by means of the resistor 15 to the collector 7 of the transistor 1. The bias resistor 22 of FIG. 1 has been replaced by the voltage divider 36 which comprises the resistors 37, 38, and 39 connected in series across a power source, shown here as the battery 41. The base 12 of the transistor 1 and the base 14 of the transistor 2 are connected by means of the resistors 26 and 27 respectively to the positive end terminal of the voltage divider 36. The input terminal 18 is connected to the center tap 29 of the primary winding of the transformer 3' by means of a transistor 42 which is connected in the common collector configuration. Thus, the base 43 of the transistor 42 is connected to the terminal 18 and the emitter 44 of the transistor 42 is connected to the center tap 29 of the primary winding of the transformer 3'. The collector 45 of the transistor 42 is connected to the junction of the resistors 38 and 39 of the voltage divider 36.

As in FIG. 1, the output of the oscillator is taken from the secondary winding of the saturable transformer. In the circuit shown in FIG. 4 the output of the oscillator is applied to the input of the push-pull transistor amplifier 51 which is employed to drive a pair of relays 52 and 53 in synchronism with the oscillator. The amplifier 51 employs a pair of pnp junction transistors having the usual emitter, collector, and base electrodes as its amplifying elements. As shown, the base 56 of the transistor 54 is connected by means of a resistor 57 to the end terminal 58 of the secondary winding section 6a of the transformer 3'. Similarly, the base 59 of the transistor 55 is connected by means of a resistor 61 to an end terminal 62 of the secondary winding section 6b of the transformer 3'. The emitter 63 of the transistor 54 and the emitter 64 of the transistor 55 are connected together and by means of a conductor 65 to the junction 66 of the secondary winding sections 6a and 6b which constitute the center tap on the secondary winding of the transformer 3'. The emitter 63 of the transistor 54 and the emitter 64 of the transistor 55 are connected together and by means of a conductor 65 to the junction 66 of the secondary winding sections 6a and 6b which constitute the center tap on the secondary winding of the transformer 3'. The emitter 63 of the transistor 54 and the emitter 64 of the transistor 55 are also connected by means of a conductor 67 to the junction of the resistors 37 and 38 of the voltage divider 36. The collector 71 of the transistor 54 is connected through the relay 52 and the conductor 73 to the negative terminal of the voltage divider 36. Similarly, the collector 72 of the transistor 55 is connected through the relay 53 and the conductor 73 to the negative terminal of the voltage divider 36. A pair of capacitors 74 and 75 shunt the relays 52 and 53 respectively.

The relay 52 has a movable contact 76 and a pair of stationary contacts 77 and 78. When the relay 52 is de-energized the contact 76 engages the contact 77, and when it is energized, the contact 76 engages the contact 78. Similarly, the relay 53 has a movable contact 81 and a pair of stationary contact 82 and 83. When the relay 53 is deenergized the contact 81 engages the contact 82 and when it is energized the contact 81 engages the contact 83. As shown, the stationary contact 77 of the relay 52 is connected by means of a resistor 84 and a source of power, shown here as the battery 85, to the stationary contact 83 of the relay 53. The stationary contact 82 of the relay 53 is connected by means of a resistor 86 and a source of power, shown here as the battery 87, to the stationary contact 78 to the relay 52. The movable contact 76 of the relay 52 is connected to the circuit output terminal 88. Similarly, the movable contact 81 of the relay 53 is connected to the circuit output terminal 89.

As mentioned before, the oscillator of FIG. 4 is identical to the oscillator of FIG. 1 with the exception of the secondary winding on the saturable transformer being adapted to provide a push-pull output and the use of a fixed bias for the transistors 1 and 2. The oscillator shown in FIG. 4 is isolated from the input terminals 18 by means of the transistor 42 connected in the common collector configuration. The transistor 42 functions as an impedance changer to prevent the reflection of the variable oscillator load to the input. As shown, the output of the amplifier is amplified by means of the push-pull amplifier 51. This amplifier can be employed in either of two ways, first, to drive a telephone channel directly from the oscillator signal or second, to operate the relays in synchronism with the oscillator as shown. The secondary of the oscillator coil serves a dual purpose of conveniently coupling output energy from the oscillator and providing D.C. isolation between the input and output of the oscillator. The amplifier 51 operates such that the transistors 54 and 55 are alternately driven conductive and non-conductive by the output of the oscillator. Thus, the relays 52 and 53 are alternately energized, placing the voltage of the batteries 85 and 87 across the output terminals 88 and 89. When the relay 52 is energized, the movable contact 76 engages the contact 78 and the output terminal 88 is made positive with respect to the output terminal 89 by the battery 86 through the contacts 82 and 81 of the relay 53 which is deenergized. When the relay 53 is energized, the movable contact 81 engages the contact 83 and the output terminal 89 is made positive with respect to the output terminal 88 by the battery 85 through the contacts 77 and 76 of the relay 52 which is deenergized. Thus, the voltage of the batteries 85 and 87 are alternately applied across the output terminals 88 and 89 which are adapted to be connected to a suitable telemetering transmission channel such as telephone lines. The relays 52 and 53 are provided for use with noisy or grounded telephone channels and are not necessary where quiet transmission means are available. Where quiet transmission means are available, the output of the amplifier 51 can be applied directly to the line.

It should be noted that it is not necessary that the output of the oscillator be adapted for push-pull operation. Push-pull operation, however, gives an added margin of safety, in that, if one of the components in either half of the circuit fails, causing that half of the circuit to be inoperative, a usable output can still be obtained from the other half of the circuit since the frequency of the output signal is its significant characteristic. This is especially important where relays having mercury wetted contacts are employed as the relays 52 and 53. While such relays are adapted to provide long life, there is a tendency for the mercury wetted contacts to bridge. If bridging of one of the relay contacts should occur, the output from the other relay in such a case would be sufficient to maintain circuit operation.

Having now described this invention, that which it is desired to secure by Letters Patent is:

1. In combination, a saturable core having a substantially rectangular hysteresis loop, a pair of inductively coupled windings wound on said core and connected in series, a pair of terminals adapted to be connected to a source of direct current voltage, one of said terminals being connected to the junction of said series connected windings, the other of said terminals being connected by separate electrical paths to the end terminals of said series connected windings to provide opposite directions of energization for said windings by said source of voltage connected to said terminals, and a pair of semiconductor devices, each having an emitter, a collector, and a base, each of said electrical paths including the emitter and collector electrodes of a separate one of said devices, the base electrode of each of said devices being connected to the end terminal of said series connected windings to which said electrical path including the emitter and collector electrodes of the other of said devices is connected to cause said transistors to effect said energization of said windings at a frequency which is proportional to the magnitude of said direct current voltage.

2. Apparatus as specified in claim 1 wherein an output winding is wound on said core.

3. Apparatus as specified in claim 1 wherein the collector electrodes of said semiconductor devices are connected to said end terminals of said series connected windings.

4. In combination, a pair of transistors, each having an emitter, a collector, and a base, a center-tapped winding wound on a core of magnetically saturable material having a substantially rectangular hysteresis loop, the collector of one of said transistors being connected to one end of said winding, the collector of the other of said transistors being connected to the other end of said winding, the base of each of said transistors being connected to the collector of the other of said transistors at the corresponding one of said winding ends, and a pair of input terminals adapted to be connected to a source of direct current voltage, one of said input terminals being connected to the center-tap of said winding, and the other of said input terminals being connected to the emitters of said transistors to cause said transistors to energize said winding in opposite directions alternately at a frequency which is proportional to the magnitude of said direct current voltage.

5. In combination, a transformer having a center-tapped primary winding and a secondary winding, said transformer being wound on a saturable core constructed of material having a substantially rectangular hysteresis loop, a pair of transistors, each having a pair of output electrodes and a control electrode, and a pair of input terminals adapted to be connected to a source of direct current voltage, one of said input terminals being connected to the center-tap of said transformer primary winding, the other of said input terminals being connected through the output electrodes of one of said transistors to one end terminal of said transformer primary winding and through the output electrodes of the other of said transistors to the other end terminal of said transformer primary winding, the control electrode of each of said transistors being connected to the end terminal of said transformer primary winding to which one of the output electrodes of the other of said transistors is connected to cause said transistors to energize said transformer primary winding in opposite directions alternately at a frequency which is proportional to the magnitude of said direct current voltage, thereby to produce in said transformer secondary winding an alternating voltage signal of said frequency.

6. In combination, a pair of transistors, each having an emitter, a collector, and a base, a transformer having a center-tapped primary winding and a secondary winding, said transformer windings being wound on a core of magnetically saturable material having a substantially rectangular hysteresis loop, the collector of one of said transistors being connected to one end of said transformer primary winding, the collector of the other of said transistors being connected to the other end of said transformer primary winding, the base electrode of each of said transistors being connected to the collector electrode of the other of said transistors at the corresponding end of said transformer primary winding, a pair of input terminals adapted to be connected to a source of direct current voltage, one of said pair of input terminals being connected to the center-tap of said transformer primary winding, the other of said input terminals being connected to the emitters of said transistors to cause said transistors to energize said transformer primary winding in opposite directions alternately at a frequency which is proportional to the magnitude of said direct current voltage, thereby to produce in said transformer secondary winding an alternating voltage signal of said frequency, and biasing means connected to the base electrodes of both of said transistors to bias said transistors in a non-conductive taste.

7. In combination, a saturable core transformer having a center-tapped primary winding and a secondary winding, a pair of transistors, each having an emitter, a collector, and a base, a pair of input terminals adapted to be connected to a source of direct current voltage, one of said input terminals being connected to the center-tap of said transformer primary winding, the other of said input terminals being connected to the emitters of both of said transistors, the collector of one of said transistors being connected to one end terminal of said transformer primary winding, the collector of the other of said transistors being connected to the other end terminal of said transformer primary winding, first resistive means connecting the base of said one of said transistors to the collector of said other of said transistors at said other end terminal, and second resistive means connecting the base of said other of said transistors to the collector of said one of said transistors at said one end terminal to cause said transistors to energize said transformer primary winding in opposite directions alternately at a frequency which is proportional to the magnitude of said direct current voltage, thereby to produce in said transformer secondary winding an alternating voltage signal of said frequency.

8. An oscillator having a frequency of oscillation proportional to the magnitiude of a direct current signal comprising, in combination, a pair of terminals adapted to be connected to a direct current signal source, a transformer having a center-tapped primary winding and a secondary winding, said transformer windings being wound on a core of magnetically saturable material having a substantially rectangular hysteresis loop, a pair of transistors, each having an output electrode, a control electrode, and an electrode common to both their input and outputs, said transistors being operated as switches with the output electrode of one of said transistors being connected to one end terminal of said primary winding, the output electrode of the other of said transistors being connected to the other end terminal of said primary winding, the control electrode of each of said transistors being connected to the output electrode of the other transistor at the corresponding one of said end terminals, the common electrode of each of said transistors being connected to one of said input terminals, and the other of said input terminals being connected to the center-tap of said transformer primary winding to cause said transistors to energize said primary winding in opposite directions alternately at a frequency which is proportional to the magnitude of said direct current signal, the output from said circuit being an oscillating signal of said frequency produced across said secondary winding of said transformer.

9. A voltage to frequency transducer adapted to produce oscillations at a frequency proportional to the magnitude of a direct current signal comprising, in combination, a pair of terminals adapted to be connected to a direct current voltage source, a transformer having a center-tapped primary winding and a center-tapped secondary winding, said transformer being wound on a ocre of magnetically said transformer being wound on a core of magnetically saturable material having a substantially rectangular hysteresis loop, a pair of transistors, each having an emitter, a collector, and a base, said transistors being operated as switches with the collector of one of said transistors being connected to one end of said transformer primary winding and the collector of the other of said transistors being connected to the other end terminal of said primary winding, the base of each of said transistors being connected to the collector of the other of said transistors at the corresponding one of said end terminals, the emitter of each of said transistors being connected to one of said input terminals, the other of said input terminals being connected to the center-tap of said transformer primary winding to cause said transistors to energize said primary winding in opposite directions alternately at a frequency which is proportional to the magnitude of said direct current signal, a push-pull amplifier connected to said center-tapped secondary winding, and a pair of relays connected to the output of said amplifier, said amplifier being adapted to operate said relays in synchronism with said oscillations to cause one of said relays to be respectively energized and deenergized during alternate half cycles of said oscillations during which the other of said relays is caused to be respectively deenergized and energized.

10. Apparatus as specified in claim 9 wherein a transistor connected in the common collector configuration is connected across said pair of terminals to isolate said transducer from said pair of terminals.

11. In an electronic circuit, a magnetic core, a winding on said core having first and second ends and a center terminal, a power source including first and second terminals, means connecting said center terminal to said first terminal, a first transistor having a collector, a base and an emitter, a second transistor having a collector, a base and an emitter, means connecting said emitters of said first and said second transistors to the said second terminal, means connecting said first end of said winding on said core to the collector of said first transistor and to the base of said second transistor, means connecting said second end of said winding on said core to the collector of said second transistor and to the base of said first transistor.

12. In an electronic circuit, a magnetic core having rectangular hysteresis loop characteristics, a winding on said core having first and second ends and a center terminal, a power source including first and second terminals, means connecting said center terminal to said first terminal, a first transistor having a collector, a base and an emitter, a second transistor having a collector, a base and an emitter, means connecting said emitters of said first and said second transistors to the said second terminal, means connecting said first end of said winding on said core to the collector of said first transistor and to the base of said second transistor, means connecting said second end of said winding on said core to the collector of said second transistor and to the base of said first transistor.

References Cited in the file of this patent

UNITED STATES PATENTS

| | | |
|---|---|---|
| 2,055,208 | Rumpel | Sept. 22, 1936 |
| 2,759,124 | Willis | Aug. 14, 1956 |
| 2,783,380 | Bonn | Feb. 26, 1957 |
| 2,783,384 | Bright | Feb. 26, 1957 |
| 2,807,758 | Pinckaers | Sept. 24, 1957 |
| 2,822,511 | McLean et al. | Feb. 4, 1958 |
| 2,837,651 | Schultz | June 3, 1958 |
| 2,849,673 | Hubbard | Aug. 26, 1958 |
| 2,908,829 | Schaeve | Oct. 13, 1959 |
| 2,912,653 | Tillman | Nov. 10, 1959 |
| 2,918,586 | Curtis | Dec. 22, 1959 |
| 2,931,991 | Schultz | Apr. 25, 1960 |
| 2,946,022 | Davis | July 19, 1960 |
| 2,963,658 | Rochelle | Dec. 6, 1960 |